US008533848B2

(12) United States Patent
Jin et al.

(10) Patent No.: US 8,533,848 B2
(45) Date of Patent: Sep. 10, 2013

(54) METHOD AND SYSTEM FOR PRODUCING MULTIMEDIA FINGERPRINT BASED ON QUANTUM HASHING

(75) Inventors: Min-Ho Jin, Daejeon (KR); Chang-Dong Yoo, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 1240 days.

(21) Appl. No.: 12/372,765

(22) Filed: Feb. 18, 2009

(65) Prior Publication Data

US 2010/0212015 A1     Aug. 19, 2010

(51) Int. Cl.
G06F 21/24     (2006.01)
(52) U.S. Cl.
USPC ............... 726/26; 380/28; 380/201; 380/204
(58) Field of Classification Search
USPC ............................................. 380/28; 726/26
See application file for complete search history.

(56) References Cited

U.S. PATENT DOCUMENTS

| 5,737,417 | A  | * | 4/1998  | Buynak et al. ............... 380/204 |
| 7,346,185 | B2 | * | 3/2008  | Grossman et al. ............ 382/100 |
| 7,362,336 | B2 | * | 4/2008  | Miller et al. ................. 345/589 |
| 7,386,125 | B2 | * | 6/2008  | Bilobrov et al. .............. 380/201 |
| 7,711,564 | B2 | * | 5/2010  | Levy et al. .................... 704/270 |
| 7,747,015 | B2 | * | 6/2010  | Bilobrov et al. .............. 380/201 |
| 7,756,292 | B2 | * | 7/2010  | Lev ............................... 382/100 |
| 7,765,598 | B2 | * | 7/2010  | Liu ................................. 726/26 |
| 7,921,296 | B2 | * | 4/2011  | Haitsma et al. ............... 713/180 |
| 8,121,843 | B2 | * | 2/2012  | Rhoads et al. ............... 704/270.1 |
| 2002/0178410 | A1 | * | 11/2002 | Haitsma et al. ............... 714/709 |
| 2005/0144455 | A1 | * | 6/2005  | Haitsma ......................... 713/176 |
| 2005/0254371 | A1 | * | 11/2005 | Wirtz et al. ................ 369/47.12 |
| 2006/0152524 | A1 | * | 7/2006  | Miller et al. ................. 345/589 |
| 2008/0263360 | A1 | * | 10/2008 | Haitsma et al. ............... 713/180 |

OTHER PUBLICATIONS http://ismir2002.ismir.net/proceedings/02-fp04-2.pdf.*
http://arxiv.org/pdf/quant-ph/9708022.pdf.*
Robust Audio Hashing for Content Identification.*

* cited by examiner

*Primary Examiner* — Kambiz Zand
*Assistant Examiner* — Yonas Bayou
(74) *Attorney, Agent, or Firm* — Schmeiser, Olsen & Watts, LLP

(57) ABSTRACT

Disclosed are a method and system for producing a multimedia fingerprint based on quantum hashing. The method includes receiving an input of a multimedia file, extracting a quantum hash type fingerprint from the input multimedia file, calculating similarity between the extracted quantum hash type fingerprint and a binary fingerprint stored in a database, and selecting, as a calculation result, data having a fingerprint calculated as having the highest similarity.

5 Claims, 4 Drawing Sheets

(a) Equalization (b) Additive Noise (c) Echo (d) Composite Set 0

(e) Composite Set 1

(f) Mixed Query (a)BR (b)FPS (c)CIF (d)CAM (e)ROT (f)Mixed Query

METHOD AND SYSTEM FOR PRODUCING MULTIMEDIA FINGERPRINT BASED ON QUANTUM HASHING

BACKGROUND OF THE INVENTION

1. Field of the Invention

The present invention relates to a method of producing multimedia fingerprints and, more particularly, to a method and system for producing a multimedia fingerprint based on quantum hashing, which produces a multimedia fingerprint based on quantum hashing in a multimedia file by a quantum hashing technique, searches a binary fingerprint corresponding to a quantum hash fingerprint in a previously constructed binary fingerprint database, and outputs metadata corresponding thereto.

2. Description of the Related Art

In general, a fingerprint in multimedia refers to data for describing characteristics of multimedia data and is produced by analyzing the multimedia data in various manners such as frequency conversion or the like. The multimedia fingerprint is used to determine whether the multimedia data is stolen or not, searching the multimedia based on the fingerprint, and the like. Fingerprint technology has been widely used for audio and video signal content.

A basic unit of information used in a computer is a bit. The bit has a value of either '0' or '1.' Further, a basic unit of quantum information corresponding to the bit is called a quantum bit or a qubit. The qubit is characterized in that it can have a value of both '0' and '1' at the same time as well as a value of either '0' or '1.' This is possible because quantum states can be superposed. In terms of quantum mechanics, the qubit indicates a state in two-dimensional Hilbert space with $\{|0\rangle, |1\rangle\}$ given as an orthonormal basis. Thus, the qubit has a general state represented as '$a|0\rangle+b|1\rangle$,' where 'a' and 'b' are complex numbers satisfying $|a|^2+|b|^2=1$. Physically, the qubit currently employs a spin state of a particle having a spin of ½, and a polarization state of a photon. The spin state of the particle having the ½-spin is employed in tests for realizing quantum computers, and the polarization state of the photon is employed in tests for quantum information transmission, quantum cryptography, etc.

"Metadata" refers to data added to content according to regular rules to efficiently find and use desired information from among a wide range of information. The metadata stores location and details of the content, information of writers, authority conditions, use conditions, use history, etc. In a computer, metadata is generally employed for the purpose of representing data and quickly searching data.

The foregoing descriptions are not intended to introduce conventional techniques well-known in the related art of the present invention, but to help an understanding of the background of the present invention.

A conventional method of producing a multimedia fingerprint is based on a hashing technique that extracts from audio/video clips an intermediate hash composed of real number values and converts the intermediate hash into binary codes. However, since such a hashing technique converts the audio/video clips into a value of either '0' or '1,' the extracted value of '0' or '1' is so vulnerable to transformation, distortion or noise involved in the multimedia that it is difficult to apply the hashing technique to various environments. Therefore, there is a need of improving the hashing technique.

SUMMARY OF THE INVENTION

The present invention is conceived to solve the problems as described above, and an aspect of the present invention is to provide a method and system for producing a multimedia fingerprint invulnerable to compression or distortion regardless of unfavorable multimedia environments such as noise or the like.

In accordance with an aspect of the present invention, a multimedia fingerprint producing method based on quantum hashing includes: receiving an input of a multimedia file; extracting a quantum hash type fingerprint from the input multimedia file; calculating similarity between the extracted quantum hash type fingerprint and a binary fingerprint stored in a database; and selecting, as a calculation result, data having a fingerprint calculated as having the highest similarity.

The multimedia file may include a distorted signal.

If the multimedia file is an audio file, the distorted signal may be generated when the audio file is passed through an equalizer, when noise is added to the audio file, or when an audio file of a compact disc (CD) format is encoded into an MP3 (moving picture experts group-1 audio layer 3) format.

If the multimedia file is a video file, the distorted signal may be generated when the video file is captured in a movie theater using a camcorder and released as a movie, or when the video file is subjected to image brightness change, size change or rotation.

In accordance with another aspect of the present invention, a system for producing a multimedia fingerprint based on quantum hashing includes: an input unit receiving an input of a multimedia file; a fingerprint extraction unit extracting a quantum hash type fingerprint from the input multimedia file; a database storing a binary type fingerprint; a database search unit calculating similarity between the extracted quantum hash type fingerprint and the binary type fingerprint stored in the database; and a fingerprint matching unit selecting and outputting, as a calculation result, data having a fingerprint calculated as having the highest similarity.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE EMBODIMENT

Hereinafter, exemplary embodiments of the present invention will be described in detail with reference to the accompanying drawings. It should be noted that the drawings are not to precise scale and may be exaggerated in thickness of lines or size of components for descriptive convenience and clarity only. Furthermore, terms used herein are defined by taking functions of the present invention into account and can be changed according to the custom or intention of users or operators. Therefore, definition of the terms should be made according to overall disclosures set forth herein.

Figure 1:
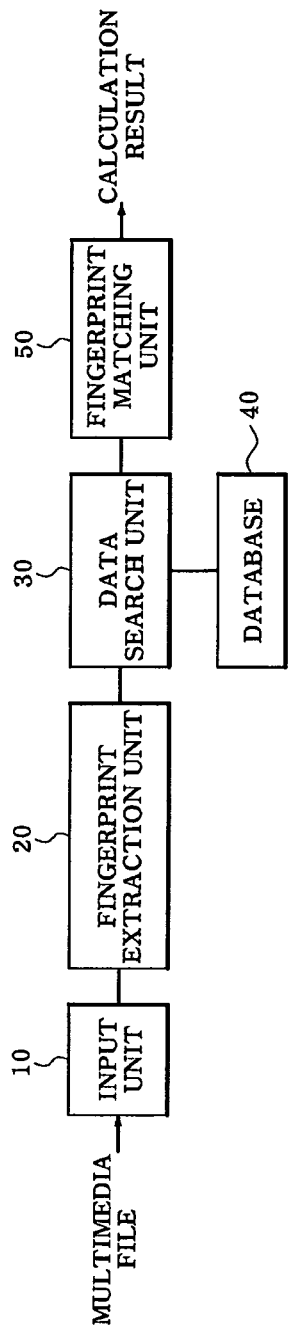
FIG. 1 is a diagram of a fingerprint producing system according to an exemplary embodiment of the present invention.

Referring to FIG. 1, which is a diagram of a fingerprint producing system according to an exemplary embodiment of the present invention, the fingerprint producing system includes an input unit 10, a fingerprint extraction unit 20, a database search unit 30, a database 40, and a fingerprint matching unit 50.

The input unit 10 receives a multimedia file and allows a user to input audio/video files to be searched.

The fingerprint extraction unit 20 extracts a quantum hash type fingerprint from the input multimedia file.

The data search unit 30 calculates similarity between the extracted quantum hash fingerprint and a binary finger print stored in the database 40 described below.

The database 40 stores binary type multimedia fingerprints. The database 40 is composed of binary fingerprints extracted from the multimedia that contain no distortion or no transformation.

Through calculation of the database searching unit 30, the fingerprint matching unit 50 selects and outputs, as a calculation result, data having a fingerprint calculated as having the highest similarity.

Figure 2:
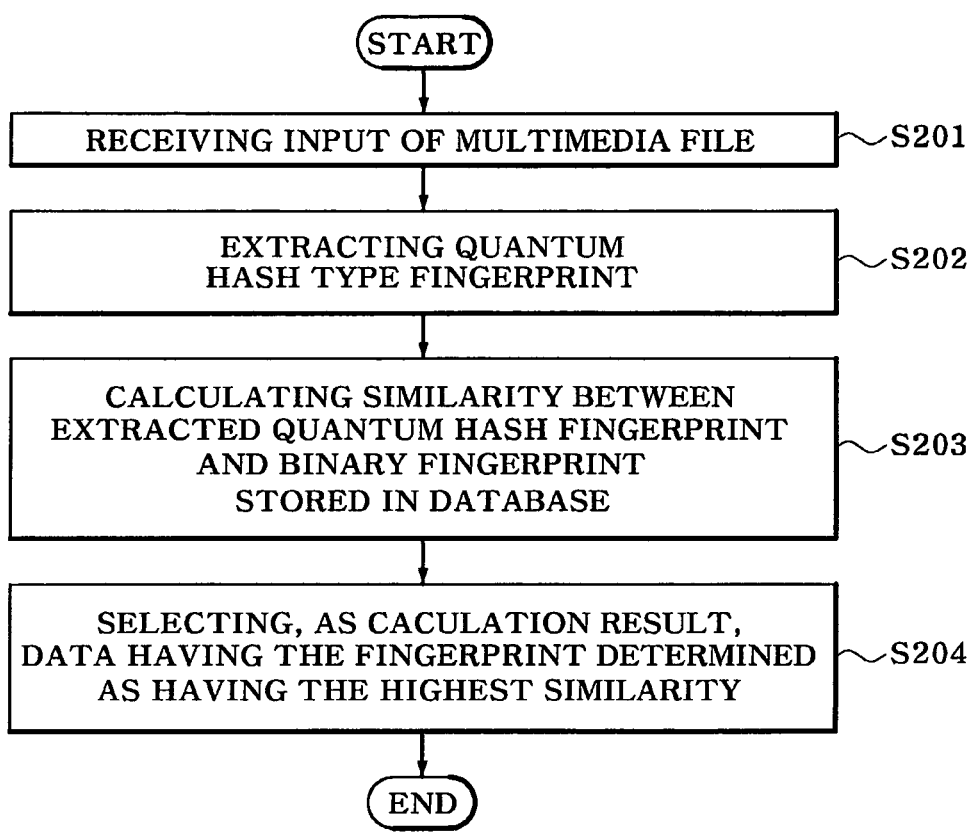
FIG. 2 is a flowchart of a multimedia fingerprint producing method based on quantum hashing according to an exemplary embodiment of the present invention.

FIG. 2 is a flowchart of a multimedia fingerprint producing method based on quantum hashing according to an exemplary embodiment of the present invention.

Referring to FIG. 2, a multimedia fingerprint producing method based on quantum hashing according to this embodiment includes receiving an input of a multimedia file at S201, extracting a quantum hash type fingerprint from the input multimedia file at S202, calculating similarity between the extracted quantum hash fingerprint and a binary fingerprint stored in a binary fingerprint database at S203, and selecting, as a calculation result, data having the fingerprint determined as having the highest similarity at S204.

According to an embodiment of the present invention, the method may further include outputting the selected data after operation S204 of selecting the data having a fingerprint calculated as having the highest similarity.

Operation S201 of receiving the multimedia file includes receiving an input of a multimedia file containing a distorted signal.

If the multimedia file is an audio file, the distorted signal can be generated when the audio file is passed through an equalizer, when noise is added to the audio file, when an audio file of a compact disc (CD) format is encoded into MP3 (moving picture experts group-1 audio layer 3) format, etc.

If the multimedia file is a video file, the distorted signal can be generated when the video file is captured in a movie theater using a camcorder and released as a movie, when the video file is subjected to change in image brightness, size, direction (that is, rotation), or the like.

Next, operation S202 of extracting the quantum hash type fingerprint from the input multimedia file will be described in detail.

An intermediate hash v[k] extracted from the $k^{th}$ frame of the input multimedia is a real number vector of a D-dimension as shown in Equation 1.

$$v[k]=[v_0[k],v_1[k],\ldots,v_{D-1}[k]] \quad \text{Equation 1}$$

The intermediate hash values are values to be quantized into binary forms, and will be converted into binary vectors as shown in Equations 2 and 3 without deterioration of generality.

$$b[k]=[b_0[k],b_1[k],\ldots,b_{D-1}[k]] \quad \text{Equation 2}$$

$$b_d[k] = \begin{cases} 1 & \text{if } v_d[k] \geq 0 \\ 0 & \text{otherwise} \end{cases} \quad \text{Equation 3}$$

In this embodiment, assume that Equation 4 is established between the intermediate hash $\tilde{v}[k]$, i.e. the real number vector of the D-dimension extracted from the $k^{th}$ frame of the original multimedia containing no distortion or no transformation, and the intermediate hash v[k], extracted from the same frame of the multimedia containing distortion or transformation.

$$\tilde{v}[k]=v[k]+e[k] \quad \text{Equation 4}$$

where e[k] is a difference between the intermediate hashes by distortion or deformation.

In this embodiment, the probability density of the difference between the intermediate hashes due to distortion or deformation is estimated by uniform, normal and nonparametric distributions, but the present invention is not limited thereto and can be realized in various modifications.

On the assumption of Equation 4, operation S202 of extracting the quantum hash type fingerprint from the input multimedia includes extracting the quantum hashes, which belong to two-dimensional Hilbert space on an orthonormal basis, among the intermediate hashes extracted from the multimedia.

$$q[k]=[q_0[k],q_1[k],\ldots,q_{D-1}[k]] \quad \text{Equation 5}$$

$$q_d[k]=\phi_d^-[k]|0\rangle+\phi_d^+[k]|1\rangle \quad \text{Equation 6}$$

In this embodiment, weights $\phi_d^-[k]$, $\phi_d^+[k]$ of the quantum hashes are set to satisfy Equations 7 and 8.

$$|\phi_d^-[k]|^2=P(\hat{b}_d[k]=0|v_d[k]) \quad \text{Equation 7}$$

$$|\phi_d^+[k]|^2=P(\hat{b}_d[k]=1|v_d[k]) \quad \text{Equation 8}$$

where $\hat{b}_d[k]$ is a binary hash extracted from multimedia content containing no distortion or no transformation, and has a relationship with $\tilde{v}_d[k]$ as shown in Equation 9.

$$\tilde{b}_d[k] = \begin{cases} 1 & \text{if } \tilde{v}_d[k] \geq 0 \\ 0 & \text{otherwise} \end{cases} \quad \text{Equation 9}$$

In this embodiment, the method of extracting the quantum hash-based fingerprint from the multimedia file uses the above equations, but the present invention is not limited thereto and can be realized in various modifications.

Next, operation S203 of calculating the similarity between the extracted quantum hash fingerprint and the binary fingerprint stored in the binary fingerprint database will be described.

Let the $d^{th}$ element of the quantum hash vector extracted from the $k^{th}$ frame of the multimedia content having the distortion or transformation be $q_d[k]$, and the $d^{th}$ element of the binary fingerprint extracted from the multimedia having no distortion or no transformation to be determined whether it is the same as the multimedia from which the quantum hash vector is extracted be $r_d[k]$.

The similarity between the quantum hash type fingerprint and the binary fingerprint is calculated by Equation 10.

$$s_1(Q_d[k],r_d[k]) = \begin{cases} |\psi_d^-[k]|^{1/2} & \text{if } r_d[k]=0 \\ |\psi_d^+[k]|^{1/2} & \text{otherwise} \end{cases} \quad \text{Equation 10}$$

A main function of the multimedia fingerprint system is to determine whether the input multimedia matches a certain binary fingerprint of the previously extracted binary fingerprint database. To this end, logic determination is used as shown in Equation 11.

$$\sum_{k=0}^{K-1}\sum_{d=0}^{D-1} s_1(Q_d[k], r_d[k]) \underset{discord}{\overset{concord}{\underset{<}{>}}} \tau \qquad \text{Equation 11}$$

where K is the frame number of the input multimedia contents, and D is the dimension of the extracted quantum hash. Further, $r_d[k]$ is the binary fingerprint that will be determined to match or not to match the input multimedia, where all binary fingerprints in the previously extracted binary fingerprint database may be considered.

In this embodiment, the method of calculating the similarity between the extracted quantum hash fingerprint and the existing binary fingerprint employs the above equations, but the present invention is not limited thereto and can be realized in various modifications.

Figure 3:
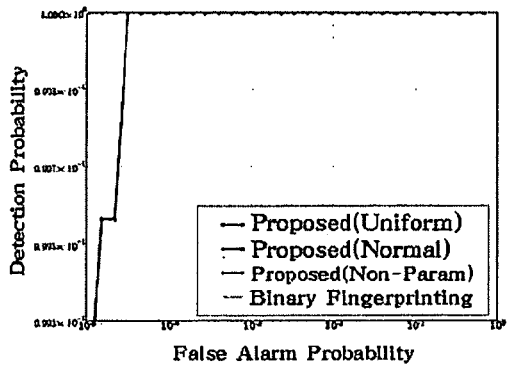
FIGS. 3 and 4 are graphs depicting improvement in performance of fingerprint producing methods according to exemplary embodiments of the present invention.
Figure 3:
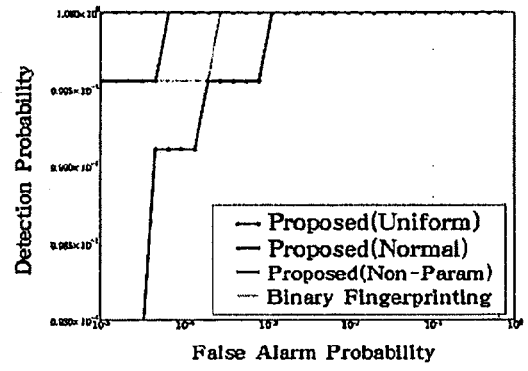
Figure 3:
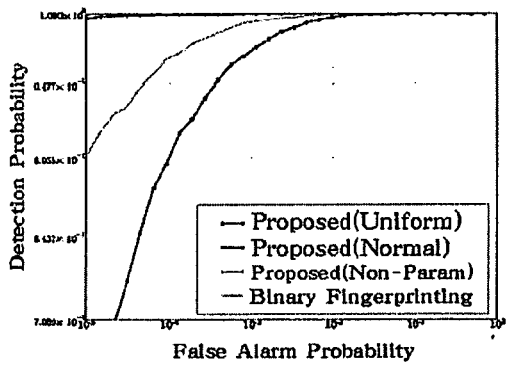
Figure 3:
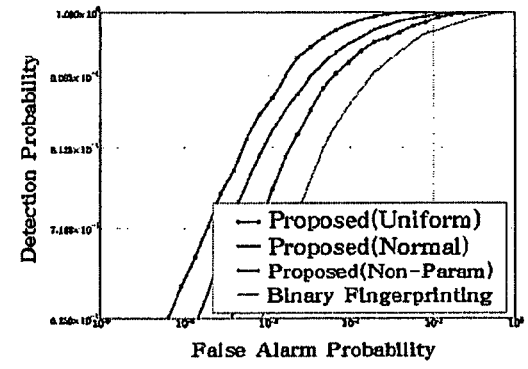
Figure 3:
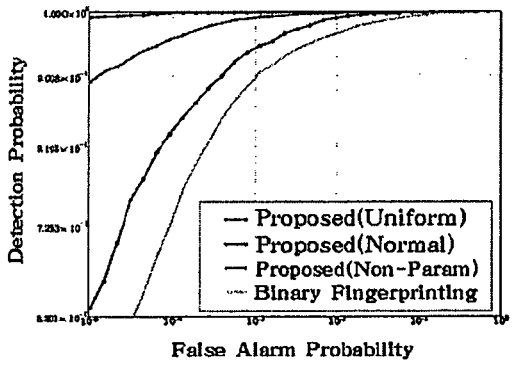
Figure 3:
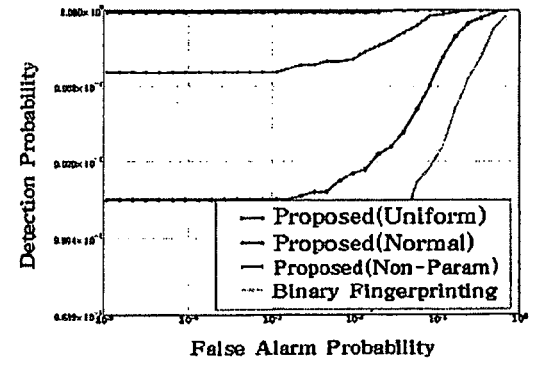
Figure 4:
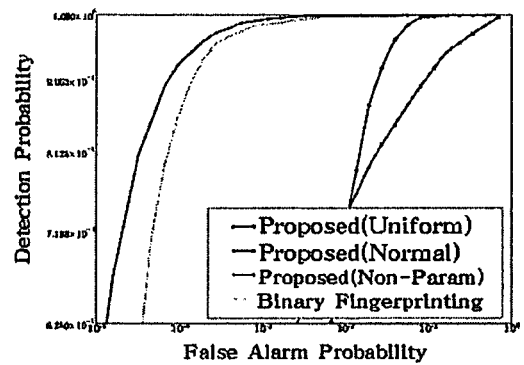
Figure 4:
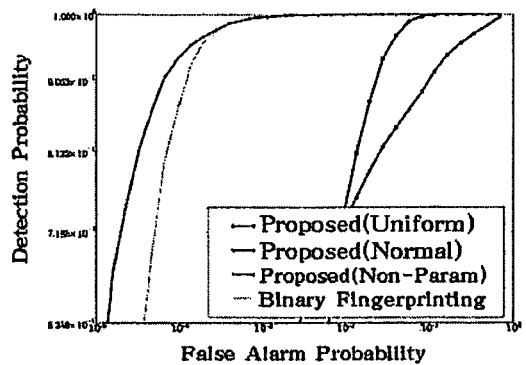
Figure 4:
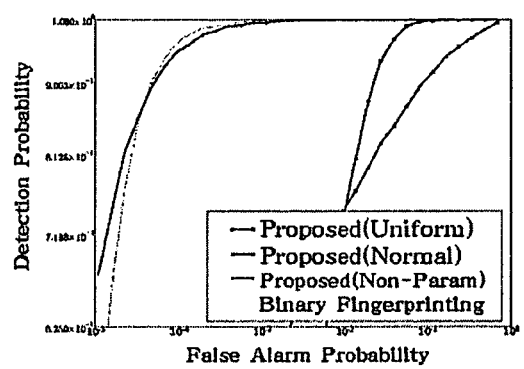
Figure 4:
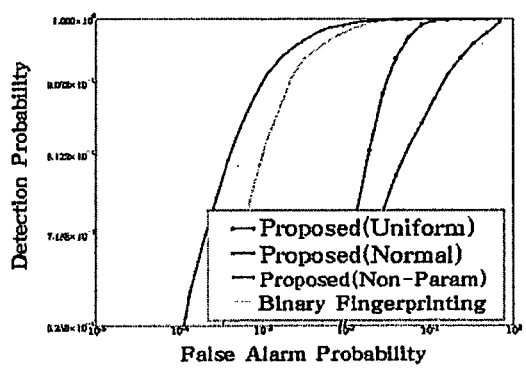
Figure 4:
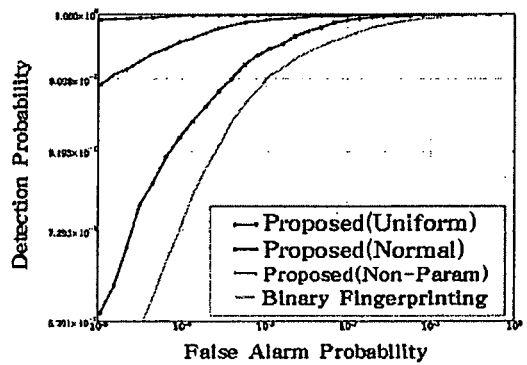
Figure 4:
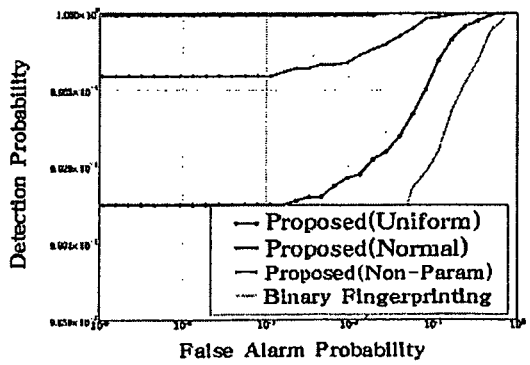
Figure 3:
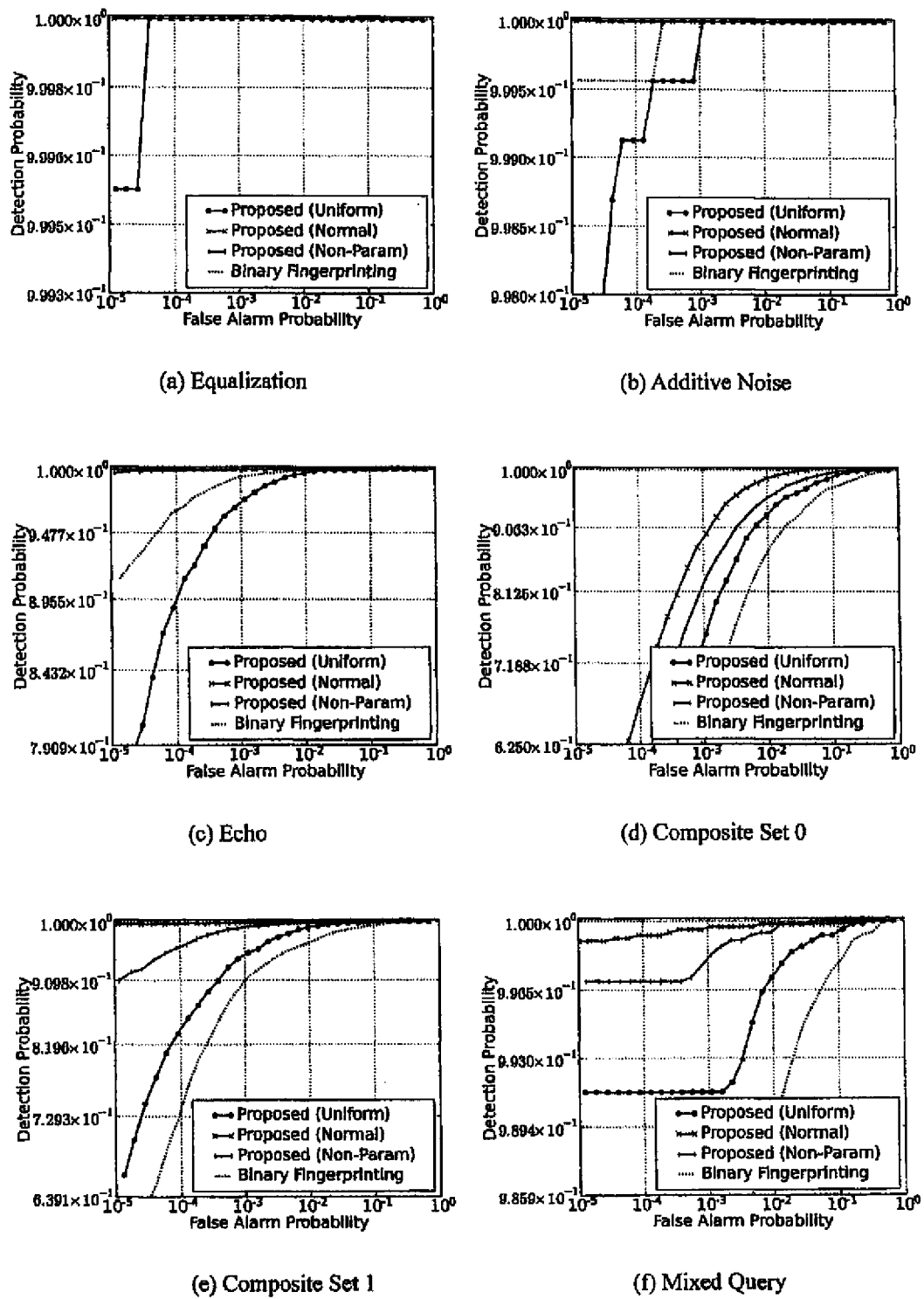
Figure 4:
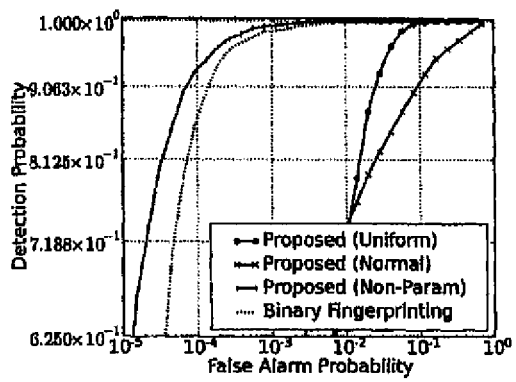
Figure 4:
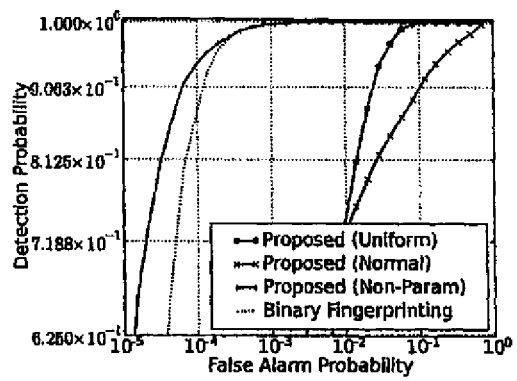
Figure 4:
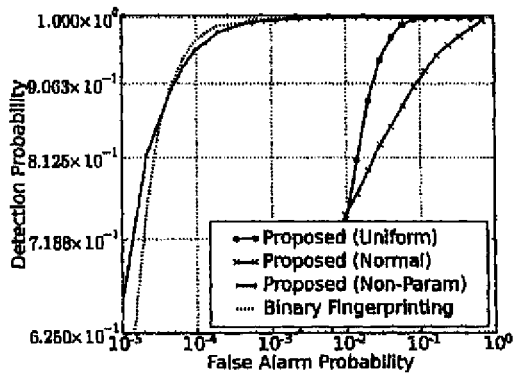
Figure 4:
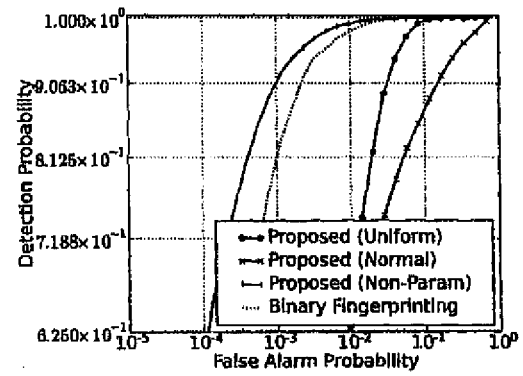
Figure 4:
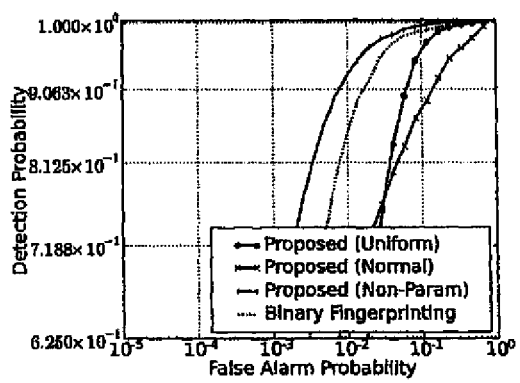
Figure 4:
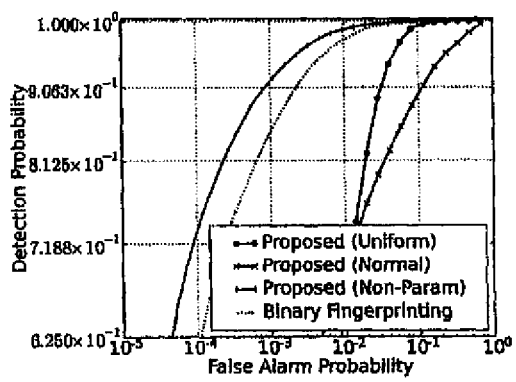

FIGS. 3 and 4 are graphs depicting improvement in performance of fingerprint producing methods according to exemplary embodiments of the present invention.

FIG. 3 is a graph depicting results from tests of the fingerprint producing method based on quantum hashing with respect to an audio file.

To compare performance of an audio fingerprint producing method according to an exemplary embodiment of the present invention with that of the existing binary audio fingerprint producing method, comparison tests were performed with regard to an audio database containing 1,000 songs corresponding to 62 hours.

The intermediate hash for extracting the quantum hash was extracted using the embodiments of the fingerprint producing method and the audio fingerprint system based on normalized spectral sub-band centroids (NSSC) disclosed in Korean Patent Laid-open Publication No. 10-0733145 (Jun. 21, 2007).

To show improvement in performance of the multimedia fingerprint system, the present embodiment employs audio distortion as follows. However, the present invention is not limited thereto, and may be applied to different distortion and transformation.

Equalization: audio signal passed through the equalizer having a gain from −6 dB to +6 dB with respect to each of 10 bands Additive Noise: Gaussian noise with signal-to-noise ratio of 25 dB Echo: signal with echo Combination Distortion 0: distortion where equalization, noise and echo coexist Combination Distortion 1: metallic echo, pitch change, and time change FIG. 3 shows a receiver operating characteristic for each distortion, and a mixed query shows a test result when the foregoing distortion exists arbitrarily.

Here, the performance of the method according to the embodiment of the invention, where the probability function of the intermediate hash due to the distortion and transformation is estimated by each of the uniform, normal and nonparametric distributions, was compared with performance of the existing binary fingerprint.

With regard to the audio fingerprint test, it can be seen from the receiver operating characteristic of FIG. 3 that great improvement was achieved using the normal and nonparametric distributions as compared with that of the existing binary fingerprint.

FIG. 4 is a graph depicting results from tests of the fingerprint producing method based on quantum hashing with respect to a video file.

To compare performance of a video fingerprint producing method according to an exemplary embodiment of the invention with that of the existing binary video fingerprint producing method, comparison tests were performed with regard to a video database containing 300 movies corresponding to 388 hours.

The intermediate hash for extracting the quantum hash was extracted using the centroid of gradient orientation.

To show improvement in performance of the multimedia fingerprint system, the present embodiment employs video distortion as follows. However, the present invention is not limited thereto, and may be applied to different distortion and transformation.

Brightness: screen brightness was increased by 25%

Frame rate: a video frame rate was converted to 15 frames per sec (FPS)

Size: pixel size was changed to the common intermediate format (CIF) standard, 352×288

DA/AD conversion: an image that is displayed by a motion picture projector and then recorded again by a camcorder Rotation: an image rotated by 3 degrees FIG. 4 shows a receiver operating characteristic for each distortion, and a mixed query shows a test result when the foregoing distortion exists arbitrarily.

Here, the video fingerprint performance according to the embodiment of the invention, where the probability function of the intermediate hash due to the distortion and transformation is estimated by each of the uniform, normal and nonparametric distributions, was compared with performance of the existing binary fingerprint.

Regarding the video fingerprint test, the receiver operating characteristic of FIG. 4 shows that large improvement is achieved using the nonparametric distributions as compared with that of the existing binary fingerprint.

As apparent from the above description, according to the embodiments of the present invention, the method and system for producing a multimedia fingerprint employs a quantum hashing technique to search data by extracting and using a fingerprint from a multimedia file, thereby producing a multimedia fingerprint invulnerable to compression, distortion, transformation, noise or the like involved in multimedia input for searching metadata.

Further, according to the embodiments of the present invention, since the multimedia fingerprint is produced by the quantum hashing technique, the fingerprint can be searched more correctly.

Although the present invention has been described with reference to the embodiments, it can be understood by a person having ordinary knowledge in the art that the embodiments are given by way of illustration only, and that various modifications and equivalent embodiments can be made without departing from the spirit and scope of the present invention. Accordingly, the scope of the present invention should be limited only by the accompanying claims.

What is claimed is:

1. A method of producing a multimedia fingerprint based on quantum hashing, comprising:
   receiving an input of a multimedia file;
   extracting a quantum hash type fingerprint from the input multimedia file;
   calculating similarity between the extracted quantum hash type fingerprint and a binary fingerprint stored in a binary fingerprint database; and
   selecting, as a calculation result, data having a fingerprint calculated as having a highest similarity;

wherein extracting the quantum hash type fingerprint from the input multimedia file includes extracting one or more intermediate hashes from the input multimedia file, and extracting quantum hashes, which belong to two-dimensional Hilbert space on an orthonormal basis, among the one or more intermediate hashes.

2. The method according to claim 1, wherein the multimedia file comprises a distorted signal.

3. The method according to claim 2, wherein if the multimedia file is an audio file, the distorted signal is generated when the audio file is passed through an equalizer, when noise is added to the audio file, or when an audio file of a compact disc format is encoded into an MP3 format.

4. The method according to claim 2, wherein if the multimedia file is a video file, the distorted signal is generated when the video file is captured in a movie theater using a camcorder and released as a movie, or when the video file is subjected to image brightness change, size change or rotation.

5. A system for producing a multimedia fingerprint based on quantum hashing, comprising:

an input unit receiving an input of a multimedia file;

a fingerprint extraction unit extracting a quantum hash type fingerprint from the input multimedia file;

a binary fingerprint database storing a binary type fingerprint;

a database search unit calculating similarity between the extracted quantum hash type fingerprint and the binary type fingerprint stored in the binary fingerprint database; and a fingerprint matching unit selecting and outputting, as a calculation result, data having a fingerprint calculated as having a highest similarity;

wherein when extracting the quantum hash type fingerprint, the fingerprint extraction unit extracts one or more intermediate hashes from the input multimedia file and extracts quantum hashes, which belong to two-dimensional Hilbert space on an orthonormal basis, among the one or more intermediate hashes.

* * * * *

UNITED STATES PATENT AND TRADEMARK OFFICE
CERTIFICATE OF CORRECTION

PATENT NO. : 8,533,848 B2
APPLICATION NO. : 12/372765
DATED : September 10, 2013
INVENTOR(S) : Jin et al.

It is certified that error appears in the above-identified patent and that said Letters Patent is hereby corrected as shown below:

In the Drawings

Please replace the drawings of figures 3 and 4 with the attached drawings.

In the Specification

Column 4

Line 23, delete "$q_d[k] = \phi_d^-[k]|0\rangle + \phi_d^+[k]|1\rangle$" and insert -- $q_d[k] = v_d^-[k]|0\rangle + v_d^+[k]|1\rangle$ --

Line 24, after "weights" delete "$\phi_d^-[k], \phi_d^+[k]$," and insert -- $v_d^-[k], v_d^+[k]$ --

Line 27, delete "$|\phi_d^-[k]|^2 = P(\hat{b}_d[k] = 0|v_d[k])$" and insert -- $|v_d^-[k]|^2 = P(\hat{b}_d[k] = 0|v_d[k])$ --

Line 30, delete "$|\phi_d^+[k]|^2 = P(\hat{b}_d[k] = 1|v_d[k])$" and insert -- $|v_d^+[k]|^2 = P(\hat{b}_d[k] = 1|v_d[k])$ --

Line 37, delete "$\bar{b}_d[k] = \begin{cases} 1 & \text{if } \bar{v}_d[k] \geq 0 \\ 0 & \text{otherwise} \end{cases}$" and insert -- $\hat{b}_d[k] = \begin{cases} 1 & \text{if } \hat{v}_d[k] \geq 0 \\ 0 & \text{otherwise} \end{cases}$ --

Line 60, delete "$s_1(Q_d[k], r_d[k]) = \begin{cases} |v_d^-[k]|^{1/2} & \text{if } r_d[k] = 0 \\ |v_d^+[k]|^{1/2} & \text{otherwise} \end{cases}$" and insert -- $s_1(q_d[k], r_d[k]) = \begin{cases} |v_d^-[k]|^{1/2} & \text{if } r_d[k] = 0 \\ |v_d^+[k]|^{1/2} & \text{otherwise} \end{cases}$ --

Signed and Sealed this
Nineteenth Day of November, 2013

Teresa Stanek Rea
*Deputy Director of the United States Patent and Trademark Office*

Column 5

Line 2, delete "$\sum_{k=0}^{K-1}\sum_{d=0}^{D-1} s_1(Q_d[k], r_d[k]) \underset{discord}{\overset{concord}{\underset{<}{>}}} \tau$" and insert -- $\sum_{k=0}^{K-1}\sum_{d=0}^{D-1} s_1(Q_d[k], r_d[k]) \underset{discord}{\overset{concord}{\underset{<}{>}}} \tau$ --

(a) Equalization
(b) Additive Noise
(c) Echo
(d) Composite Set 0
(e) Composite Set 1
(f) Mixed Query (a) BR (b) FPS (c) CIF (d) CAM (e) ROT (f) Mixed Query